March 6, 1951 E. P. DI GIANNANTONIO 2,544,010
PHONOGRAPH RECORD
Filed Nov. 15, 1945
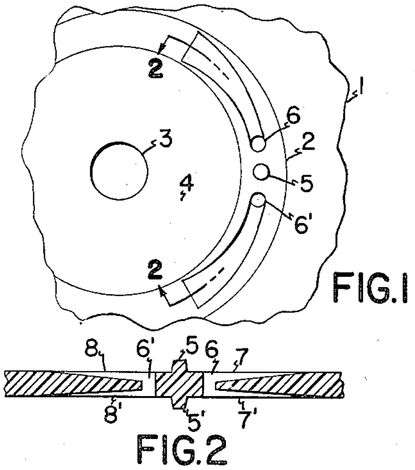
FIG. 1, FIG. 2
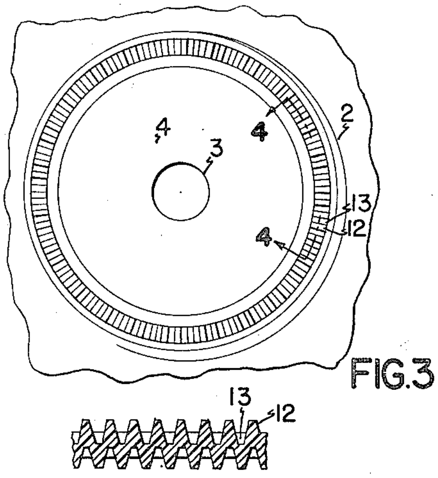
FIG. 3, FIG. 4
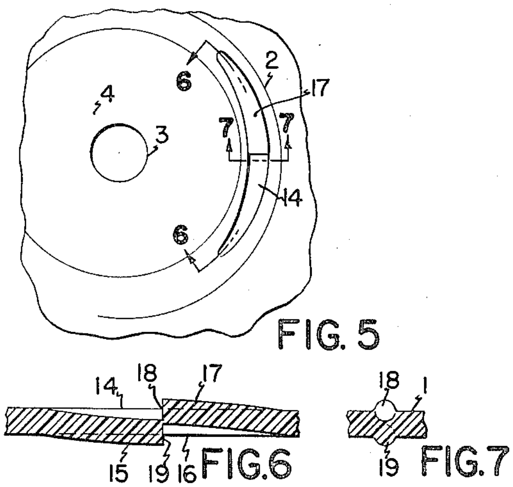
FIG. 5, FIG. 6, FIG. 7
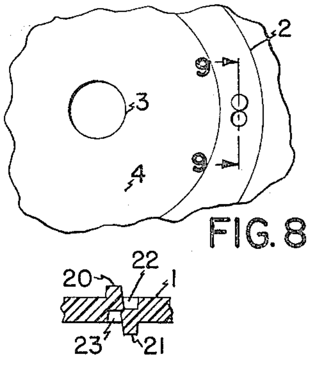
FIG. 8, FIG. 9
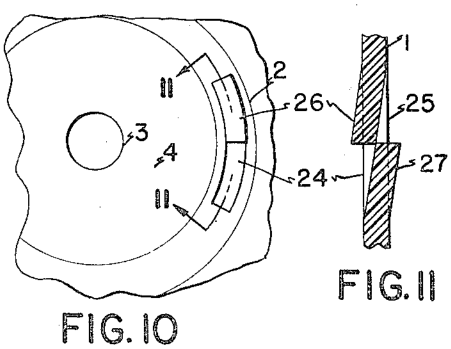
FIG. 11
FIG. 10
*INVENTOR.*
EDMOND P. DiGIANNANTONIO
BY [signature]
his Attorney Patented Mar. 6, 1951 2,544,010

UNITED STATES PATENT OFFICE 2,544,010

PHONOGRAPH RECORD

Edmond P. Di Giannantonio, Brookline, Mass., assignor of twenty-five per cent to David Broude and Ezekiel Wolf, both of Boston, Mass.

Application November 15, 1945, Serial No. 628,789

14 Claims. (Cl. 274—42)

The present invention relates to a phonograph record and more particularly to records which are made of light plastic materials.

The invention more particularly applies to records used with automatic changers where successive records are stacked one upon another on the phonograph turn-table for playing. The usual turn-table is provided with a felt surface which offers a soft material for the protection of the record and also prevents the record from slipping by providing a sufficient friction to keep the record in place when turning. Where only a single record is applied no difficulty, because of slipping, is encountered. However when the records begin to be stacked upon one another, the top record tends to slip when the needle bears down upon it in the turning of the turntable. This results because of insufficient friction between the top record and the record beneath it on the turn-table.

The difficulty mentioned above is encountered more particularly in light plastic records and not so much in the older type of heavier records made from shellac or shellac material.

The device of the present invention aims to overcome the slipping of the record in its turning on the turn-table which creates a so-called "Wow" or strange sound which is highly objectionable. This noise is actually produced in the loud speaker through which the record is heard and is a distortion due to the fact that because of slippage the record is not being run at the right speed and therefore the sounds are not properly reproduced.

The present invention is of an extremely simple nature, and may be incorporated in the ordinary form of disc as currently used.

The invention will be more fully described in connection with the embodiment described in the specification below shown in the drawing, in which—

Figure 1 shows a fragmentary plan view of the record of the present invention.

Figure 2 shows a section taken on the line 2—2 of Figure 1.

Figure 3 shows a modification of the record of Figure 1.

Figure 4 shows a section on the line 4—4 of Figure 3.

Figure 5 shows a further modification of the record shown in Figure 1.

Figure 6 shows a view taken on the line 6—6 of Figure 5.

Figure 7 shows a view taken on the line 7—7 of Figure 5.

Figure 8 shows a further modification of the record of Figure 7.

Figure 9 shows a sectional view taken on the line 9—9 of Figure 8.

Figure 10 shows a fragmentary plan view of a modification of the record of Figure 1, and, Figure 11 shows a sectional view taken on the line 11—11 of Figure 10.

In the arrangement indicated in Figure 1, the record 1 is provided in the usual manner with a spiral groove 2 by means of which the needle of the pick-up head travels from the outer edge of the disc on to the playing groove and then on to the center of the record where the pick-up arm is raised and returned to its initial playing position for the playing of the next record in the manner usually employed in the record changing device.

The record, as in the ordinary record construction is provided with a central hole 3 through which the post of the turn-table plate projects and a surrounding flat circular place 4 on which the label is usually placed. Beyond the circular place of the label in Figure 1, is positioned and mounted a pin 5 which projects from both faces of the record as indicated in Figure 2. This pin 5 is positioned between successive convolutions of the spiral groove 2 or inward of the last convolution of the spiral so that the pick-up needle never comes in contact with the pin. This pin preferably is pressed as part of the record in its manufacture. At either side of the pin 5 are holes 6 and 6' at which the tapering arcuate grooves 7, 7' and 8, 8', terminate. These grooves are the same width as the diameter of the holes at the holes but may be wider at their beginning where they are also shallower. The grooves are of a reasonable length as perhaps one-half to three-quarters of an inch.

In the use of the phonograph records, let us assume by way of explanation that one record has already been deposited on the rotating turn-table in the usual manner. This record on its top surface will be provided with the concentric wedge shaped grooves 7 and 8 terminating in holes 6 and 6'. The next record coming down will have the pin 5 facing downward and at the same distance from the center of the record as the grooves 7 and 8 and holes 6 and 6', respectively. As the turn-table begins to turn, the top record will slip sufficiently when the pick-up arm bears upon it until the pin of the top record has engaged the groove 7 and slipped into the hole 6 of the record beneath. The two records will then be engaged and turn with the turn-table without slipping. The pin 5 should not be more in height than one-half of the thickness of the record.

The fact that the pin prevents the faces of the records from coming in contact with each other over the record surfaces, tends to insure the action that the top record will turn sufficiently with respect to the one beneath until the pin and the hole are engaged with one another.

In the arrangement shown in Figures 3 and 4, a modification of construction shown in Figures 1 and 2 is employed. In this arrangement both faces of the disc are provided with uniform sets of projections and recesses 12 and 13 respectively arranged alternately around the disc just beyond the label space 4. These projections and recesses are of such a nature that they interlock with each other to permit the faces of adjacent discs to come together. As the upper disc is lowered down on the turn-table, a very small relative turn of the top disc will settle it in face to face relation with the disc beneath it.

In the arrangement shown in Figures 5, 6 and 7, a wedge shaped arcuate groove 14 is pressed into the face of the disc on one side and a corresponding wedge shape projection 15 is pressed outward on the opposite side with the same grooves and wedge 16 and 17 respectively pressed in the opposite direction in an adjacent portion of the same arc. These wedge shaped grooves may be narrowed at their shallow ends or widened if desired, and similarly the wedge projections may be narrowed at their beginning or widened if desired. In the arrangement therefore in Figures 5, 6 and 7, both faces of the record disc will have a wedge shape groove and projection running in opposite directions on the faces of the disc with the ends 18 and 19 of the projections and grooves aligned perpendicular to the face of the record.

As indicated more clearly in Figure 7, these end faces may be circular in shape. In place of the wedge shaped grooves and projections of Figures 5, 6 and 7, projecting pins 20 and 21 as indicated in Figures 8 and 9 may be used. The top pin 20 will have a recess of the same shape 22 aligned in an arc beside it, while the projecting pin 21 will also have a corresponding recess 23. The recesses 22 and 23 of Figures 8 and 9 will receive pins of the other records corresponding to the pins 20 and 21 respectively, while pins 20 and 21 will engage the recesses of the other records as the records successively interlock in place in their turning.

In the ordinary phonograph turn-table, the records are rotated clock-wise so that when the new record is retarded with respect to the record beneath it, the rotation is counter-clockwise. In all of the arrangements indicated in the figures, whichever face of the record happens to be down, the records, it will be seen, will interlock with each other. This is also true in the arrangement of Figures 10 and 11 which is similar to the arrangement shown in Figures 5, 6 and 7, with the exception that the grooves 24 and 25 are of the same width and so also the projecting wedges 26 and 27.

In the operation of the turn-table, when the record comes down over the turn-table, the bottom record will be turning before the new record coming down, so that the relative counter-clockwise motion will bring the two records together in their interlocking position.

In the forms indicated in all but Figures 3 and 4, the locking grooves and pins of two adjacent records may be somewhat far apart. However they will soon slide together, particularly because of the pressure of the needle and the head and because the projecting pins tend to hold the surfaces apart until the pins and grooves interlock in place.

Having now described my invention, I claim:

1. In combination with a phonograph disc record having a center about which the disc is to rotate, a projecting element having a height less than the thickness of the record provided on one side thereof and a recess of such a size as to receive an element similar to the projecting element on the other side of the record, said projecting element and recess both being located at the same radial distance from the center of the record and shaped to engage a similar projection and recess of another record providing engagement of adjacent surfaces of successively stacked records over substantially their whole surfaces.

2. In combination with a phonograph disc record about which the disc is to rotate, a projecting pin having a height less than the thickness of the record projecting from one face thereof, a recess provided on the other face of said record large enough to receive a pin of the size of the said projecting pin, said recess and said projecting pin both being located at the same radial distance from the center of the record and shaped to engage a similar projection and recess of another record providing engagement of adjacent surfaces of successively stacked records over substantially their whole surfaces.

3. In combination with a phonograph disc having a center about which the disc is to rotate, a projecting element having a height less than the thickness of the record extending from one face thereof, and a recess slightly larger in dimension than said projecting element for receiving a similar projecting element, said recess being located on the other face of said record, both recesses and projecting element being located at the same radial distance from the center of the record and shaped to engage a similar projection and recess of another record providing engagement of adjacent surfaces of successively stacked records over substantially their whole surfaces.

4. In combination with a phonograph disc having convolutions of spiral grooves and a center about which the disc is to rotate, a projecting element having a height, less than the thickness of the record extending from one face thereof, and a recess slightly slightly larger in dimension than said projecting element for receiving a similar projecting element, said recess being located on the other face of said record, both recess and projecting element being located at the same radial distance from the center of the record and shaped to engage a similar projection and recess of another record providing engagement of adjacent surfaces of successively stacked records over substantially their whole surfaces, both said projecting element and said recess being positioned between convolutions of the spiral groove contained on said record.

5. In combination with a phonograph disc having convolutions of spiral grooves and a center about which the disc is to rotate, a projecting element having a height less than the thickness of the record extending from one face thereof, and a recess slightly larger in dimension than said projecting element for receiving a similar projecting element, said recess being located on the other face of said record, both recess and projecting element being located at the same radial distance from the center of the record and shaped to engage a similar projection and recess of another record providing engagement of adjacent surfaces of successively stacked records over substantially their whole surfaces, both said projecting element and recess being located within the innermost convolution of the spiral groove contained in said record.

6. In combination with a phonograph disc having a center about which the disc is to rotate, a projecting element having a height less than the thickness of the record extending from one face thereof, and a recess slightly larger in dimension than said projecting element for receiving a similar projecting element, said recess being located on the other face of said record, both recess and projecting element being located at the same radial distance from the center of the record, said recess being at the end of an arcuate tapered groove having the same radial distance from the center of the record as the recess, both recess and projecting element being shaped to engage a similar projection and recess of another record providing engagement of adjacent surfaces of successively stacked records over substantially their whole surfaces.

7. In combination with a phonograph record disc having a center about which the disc is to rotate, a series of recesses on one face of said record all at the same radial distance from the center, a projecting member of a height less than the thickness of the record projecting from the other face of said disc at the same radial distance as said recesses, said projecting member being of such a size as to engage in recesses similar to the recesses in the other face of said record permitting the surface of adjacent discs to engage each other over their whole area.

8. In combination with a phonograph record disc having a center about which the disc is to rotate, a circle of successive projections and indentations at both faces of the record, said circle being concentric with the center of the record, said projections and indentations adapted to engage projections and indentations of similar size and shape of another record adapted to lie in face to face relation on the same.

9. In combination with a phonograph disc record having a center about which the disc is to rotate, short pins extending opposite one another from the face of the record and holes of a size to receive similar pins located on both sides of the pins all at the same radial distance from the center of the record.

10. In combination with a phonograph disc record having a center about which the disc is to rotate, short pins extending opposite one another from the face of the record and holes of a size to receive similar pins located on both sides of the pins all at the same radial distance from the center of the record, and arcuate grooves approaching each hole, deepening towards the hole.

11. In combination with a phonograph disc record having a center about which the disc is to rotate, a projecting pin and a recess both at the same radial distance from the center of the record on one face thereof, and a recess and projecting pin on the other face thereof, the pin of one face and the recess of the other being directly over one another.

12. In combination with a phonograph record disc having a center about which the disc is to rotate, a projecting pin and a recess adjacent one another both at the same radial distance from the center of the record on one face thereof, and a recess and projecting pin on the other face thereof, the pin of one face and the recess of the other being directly over one another.

13. In combination with a phonograph disc record having a center about which the disc is to rotate, a projecting wedge and a correspondingly shaped recess adjacent one another both at the same radial distance from the center of the record on one face thereof, and a recess and projecting wedge on the other face thereof, the projecting wedge on one face and the recess on the other face being directly over one another.

14. A phonograph disc record adapted to be arranged in surface contact in a stack and having a center about which the disc is to rotate, a projecting element provided on one face thereof, said record being provided with a recess directed inwardly from the opposite face and of configuration complementary to the projecting element, said projecting element and recess being located at the same radial distance from the center of the record.

EDMOND P. DI GIANNANTONIO.

REFERENCES CITED

The following references are of record in the file of this patent:

UNITED STATES PATENTS

| Number | Name | Date |
|---|---|---|
| 1,288,610 | Jones | Dec. 24, 1918 |
| 1,675,852 | Geer | July 3, 1928 |

FOREIGN PATENTS

| Number | Country | Date |
|---|---|---|
| 469,666 | Germany | Dec. 19, 1928 |